United States Patent [19]
Horie et al.

[11] Patent Number: 5,638,266
[45] Date of Patent: Jun. 10, 1997

[54] FREE WHEEL DIODE ARRANGEMENT FOR NEUTRAL POINT CLAMPED ELECTRIC POWER CONVERSION APPARATUS

[75] Inventors: Akira Horie; Syuuji Saitou; Hiroshi Itahana, all of Hitachinaka, Japan

[73] Assignees: Hitachi, Ltd.; Hitachi Mito Engineering Co., Ltd., both of Japan

[21] Appl. No.: 401,679

[22] Filed: Mar. 10, 1995

[30] Foreign Application Priority Data

Mar. 10, 1994 [JP] Japan .................................. 6-039433

[51] Int. Cl.⁶ .................................. H02M 7/5387
[52] U.S. Cl. .................. 363/132; 363/137; 363/56
[58] Field of Search .................. 363/17, 53, 54, 363/56, 58, 127, 129, 132, 137, 141

[56] References Cited

U.S. PATENT DOCUMENTS

| | | | |
|---|---|---|---|
| 4,855,893 | 8/1989 | Kratz | 363/58 |
| 4,864,385 | 9/1989 | Itahana et al. | 363/141 |
| 4,881,159 | 11/1989 | Holtz et al. | 363/137 |
| 4,975,825 | 12/1990 | Huss et al. | 363/141 |
| 5,155,675 | 10/1992 | Marayama et al. | 363/132 |
| 5,253,613 | 10/1993 | Bailey et al. | 363/141 |
| 5,274,542 | 12/1993 | Tanaka et al. | 363/132 |
| 5,361,196 | 11/1994 | Tanamachi et al. | 363/132 |
| 5,383,108 | 1/1995 | Okayama et al. | 363/137 |
| 5,459,655 | 10/1995 | Mori et al. | 363/132 |

FOREIGN PATENT DOCUMENTS

| | | | |
|---|---|---|---|
| 0 321 865 | 6/1989 | European Pat. Off. | H02M 7/515 |
| 42 37 120 | 5/1993 | Germany | H02M 7/04 |
| 1-198280 | 8/1989 | Japan | H02M 7/515 |
| 2-131370 | 5/1990 | Japan | H02M 7/48 |
| 2-262827 | 10/1990 | Japan | H02H 7/122 |

*Primary Examiner*—Jeffrey L. Sterrett
*Attorney, Agent, or Firm*—Evenson, McKeown, Edwards & Lenahan P.L.L.C.

[57] ABSTRACT

The invention is directed to a neutral point clamped electric power conversion apparatus having four semiconductor switching elements connected in series. The capacity of outer free wheel diodes connected in reverse parallel with outer semiconductor switching elements are increased compared to that of inner free wheel diodes, thereby minimizing, an imbalance in losses between the inner and the outer free wheel diodes.

5 Claims, 8 Drawing Sheets

FREE WHEEL DIODE ARRANGEMENT FOR NEUTRAL POINT CLAMPED ELECTRIC POWER CONVERSION APPARATUS

BACKGROUND OF THE INVENTION

This invention relates to a neutral point clamped electric power conversion apparatus, and in particular, it relates to a free wheel diode for use therefor.

Neutral point clamped electric power conversion apparatuses have been disclosed in Japanese Patent Applications Nos. 2-262827, 2-131370 and 1-198280, in which they comprise: first, second, third and fourth switching elements connected in series, with a series circuit of clamping diodes connected in reverse parallel between a connection node of the first and the second switching elements and another connection node of the third and the fourth switching elements; and a free wheel diode connected in reverse parallel to each one of the foregoing switching elements.

It has been confirmed through application of the above-mentioned prior art in actual neutral point clamped electric power conversion apparatus that there arises a new problem in the form of an imbalance in power dissipation or losses among the respective free wheel diodes. That is, if the same cooling design is applied to all of respective free wheel diodes, without taking into account their specific requirements for cooling, such an imbalance power losses causes a difference in the rate of degradation of these elements due to the heat cycle, which in turn causes an imbalance in the lifetimes of the outer diodes compared that of the inner diodes. This phenomenon eventually doubles the frequency of part replacement. Further, in more serious cases, the temperature of any free wheel diode in which a large loss occurs will increase until it breaks down.

SUMMARY OF THE INVENTION

The main object of the invention is to provide a neutral point clamped electric power conversion apparatus which is free from imbalance in the power losses among the free wheel diodes thereof.

The foregoing object of the invention is accomplished by providing a neutral point clamped electric power conversion apparatus having first, second, third and fourth switching elements connected in series; a series circuit of clamping diodes connected in reverse parallel between a connection node between the first and the second switching elements and another connection node between the third and the fourth switching elements; and a free wheel diode connected in reverse parallel to each one of the foregoing switching elements, wherein respective free wheel diodes connected in reverse parallel to the first and the fourth switching elements have a greater current capacity in comparison to that of the free wheel diodes connected in reverse parallel to the foregoing second and third switching elements.

As will be described later, the free wheel diodes connected in reverse parallel to the first and the fourth switching elements (outer switching elements) have a greater power loss than the free wheel diodes connected in reverse parallel to the second and the third switching elements (inner switching elements). Such imbalance in the power losses, however, can be eliminated by providing the free wheel diodes connected to the outer switching elements with a greater current capacity than that of the free wheel diodes connected to the inner switching elements.

BRIEF DESCRIPTION OF THE DRAWINGS

The invention will be more clearly understood with reference to the accompanying drawings, in which.

PREFERRED EMBODIMENT OF THE INVENTION

Figure 1:
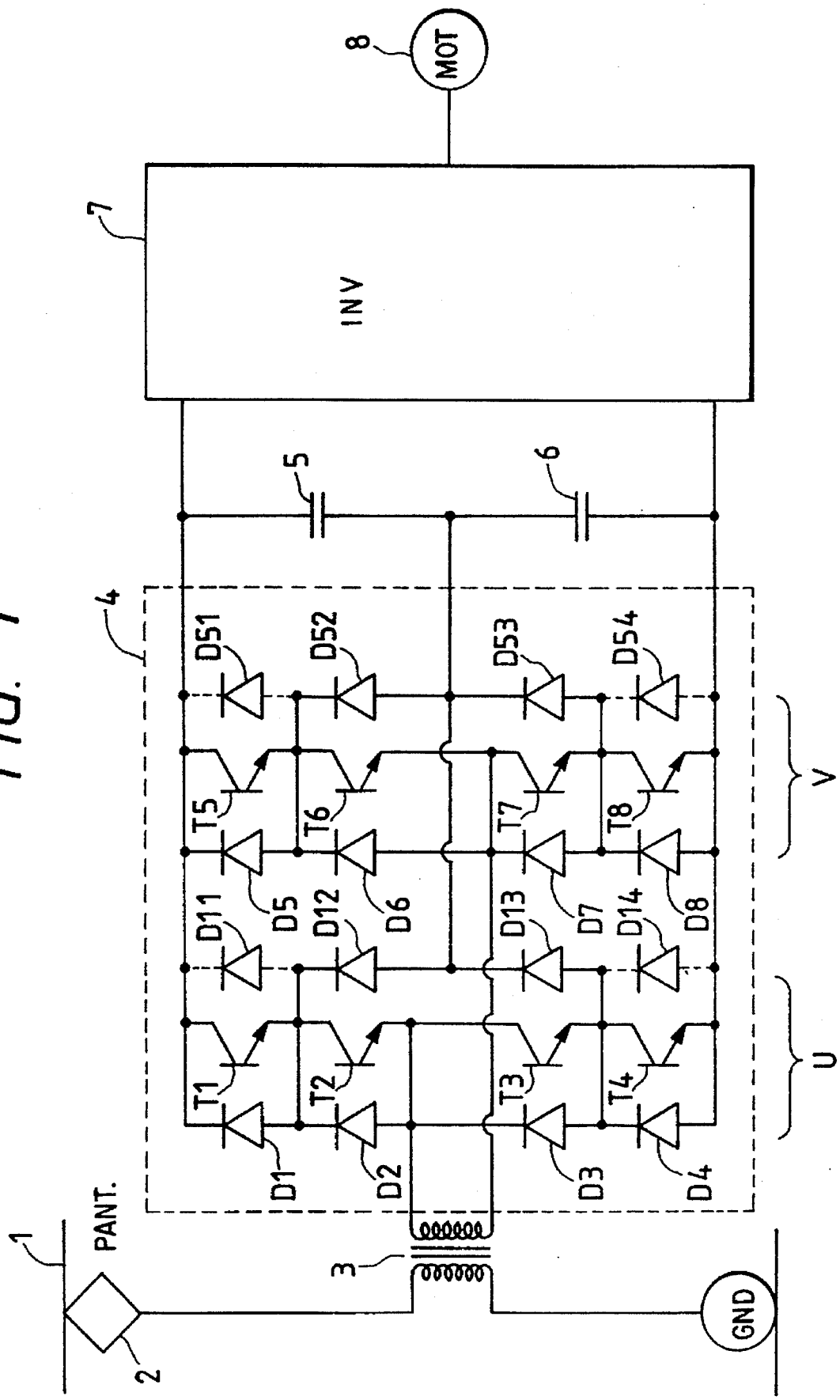
FIG. 1 is a schematic diagram of one embodiment of the invention.

In the drawings reference numerals $T_1$–$T_8$ ... transistors, $D_{12}$, $D_{13}$, $D_{52}$, $D_{53}$ ... clamping diodes, $D_1$–$D_4$ ... free wheel diodes, $D_{11}$, $D_{14}$, $D_{51}$, $D_{54}$ ... capacity enhancement free wheel diodes.

With reference to FIG. 1, there is shown one embodiment of the invention which has been applied to a neutral point clamped converter for use in an electric train.

An alternating current from an AC feeder 1 is received via a pantagraph 2, and its voltage is stepped down through a step-down transformer 3. This stepped-down alternating current is converted to a dc voltage to coincide with a dc voltage command in a neutral point clamped converter 4 by means of pulse width modulation (PWM). Through tap capacitors 5,6 which serve also as a filter, this converted direct current is input to an inverter 7 in which it is inverted into a three phase alternating current of a variable voltage variable frequency, to drive an induction motor 8 for use in driving an electric train. By way of example, this inverter 7 may be provided as a two-phase inverter or as a three-level (neutral point clamped) inverter as shown here. Further, it may also be provided as a chopper for driving a dc motor when the dc motor is used for driving the electric train.

In the neutral point clamped converter 4, series connected transistors $T_1$–$T_4$ switching elements, free wheel diodes $D_1$–$D_4$ connected in parallel to each of transistors $T_1$–$T_4$ and a series circuit of clamping diodes $D_{12}$, $D_{13}$ connected in reverse parallel between connection nodes of the outer elements $T_1$, $T_4$ and the inner elements $T_2$, $T_3$ constitute a U-phase circuit. The V-phase is composed likewise.

An output from the transformer 3 is input to each connection node between respective inner elements (namely, between transistors $T_2$ and $T_3$, and between transistors $T_6$ and $T_7$). Further, the positive side of the tap capacitor 5 is connected with collectors of transistors $T_5$, $T_1$ and cathodes of free wheel diodes $D_1$, $D_5$, while the negative side of the tap capacitor 6 is connected with emitters of transistors $T_4$, $T_8$ as well as anodes of free wheel diodes $D_4$, $D_8$. Further, a connection node (hereinafter referred to as a neutral point) between tap capacitors 5 and 6 is connected with a connection node between clamping diodes $D_{12}$ and $D_{13}$, and between $D_{52}$ and $D_{53}$.

In the description of this preferred embodiment of the invention, the self-quenching switching element is specified, by way of example, as a transistor. However, the invention is not limited in this respect. Rather the self-quenching switching elements may be a GTO thyristor, IGBT, or capacitance thyristor, and in any of them the principles of the invention as described below are applicable.

In addition to the basic configuration of the neutral point clamped converter design described above having outer elements of transistors $T_1$, $T_4$, $T_5$ $T_8$ and existing outer free wheel diodes $D_1$, $D_4$, $D_5$, $D_8$, attached to respective transistors, in this embodiment of the invention, another set of free wheel diodes $D_{11}$, $D_{14}$, $D_{51}$, $D_{54}$ are also connected in reverse parallel to the outer elements, so that a substantial current capacity of the outer free wheel diodes becomes greater than that of the inner free wheel diodes $D_2$, $D_3$, $D_6$, $D_7$. In the circuit of FIG. 1, these newly added free wheel diodes are shown as connected in series to the clamping diodes; however, the invention is not limited to this specific configuration. The same effect can be accomplished by connecting them, for example, in parallel with the existing outer free wheel diodes, provided that an equivalent electrical connection is ensured.

The principles of the present invention will be described with reference to FIGS. 2 to 4.

Figure 2:
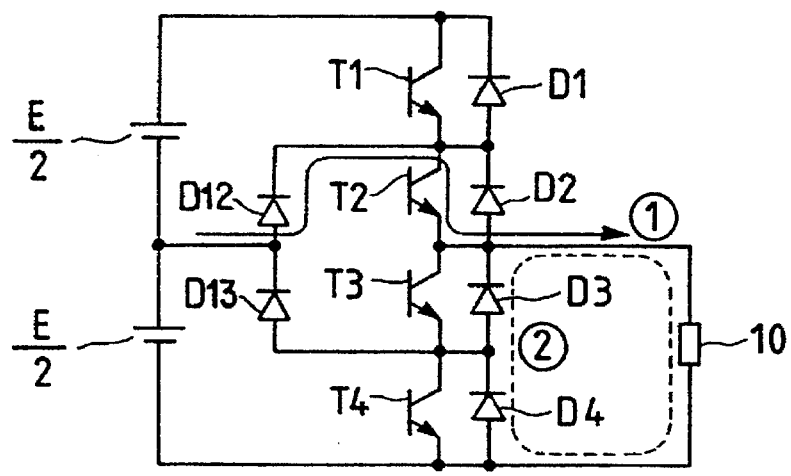
FIG. 2 is a diagram indicative of principles of the invention.
Figure 2A:
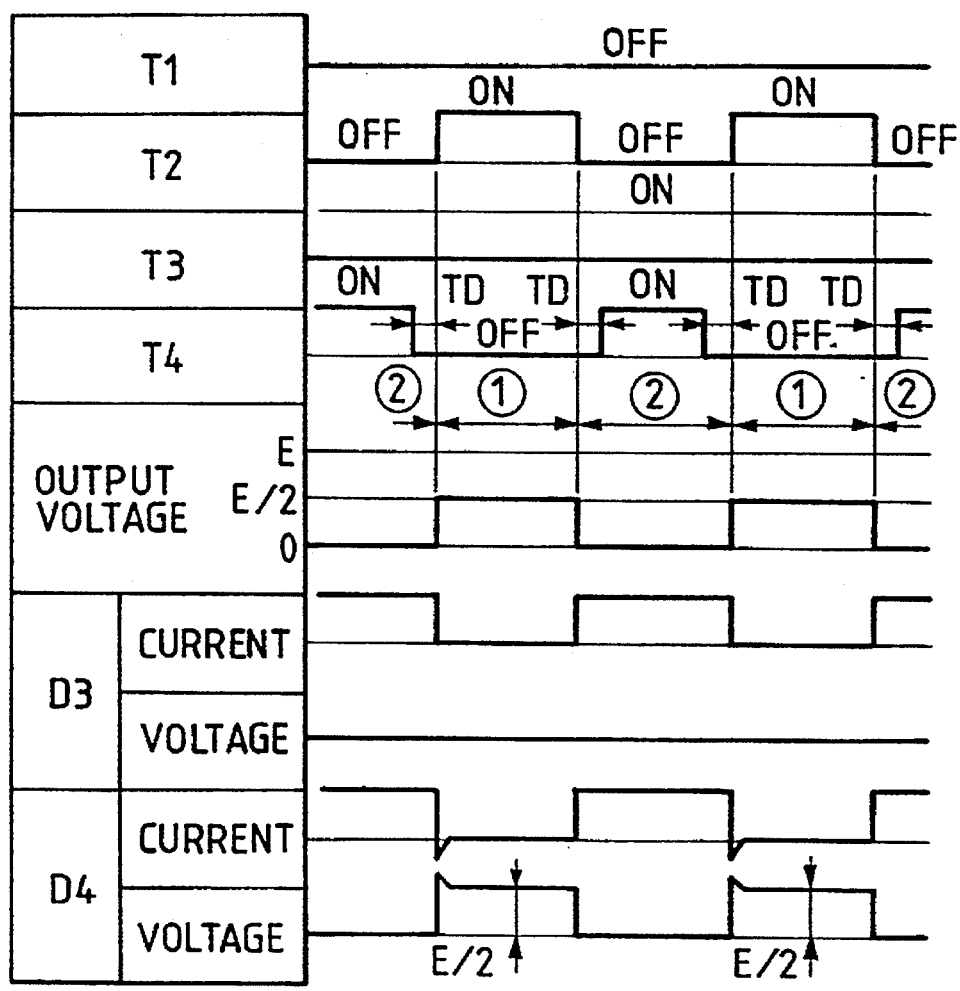
Figure 3:
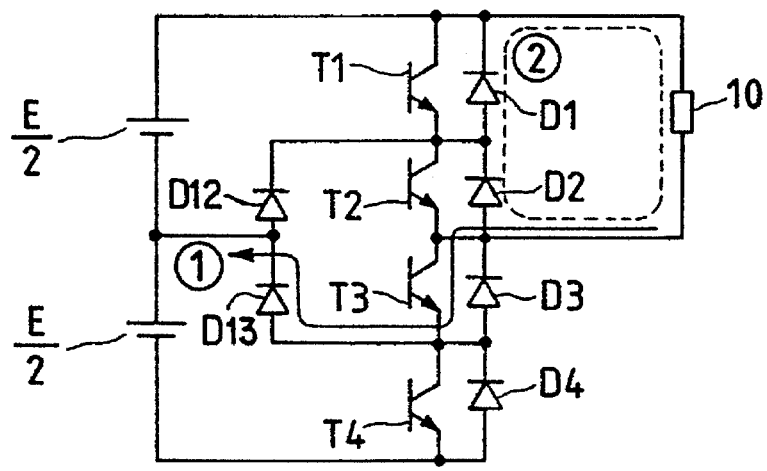
FIG. 3 is a diagram indicative of another aspect of the principles of the invention.
Figure 3A:
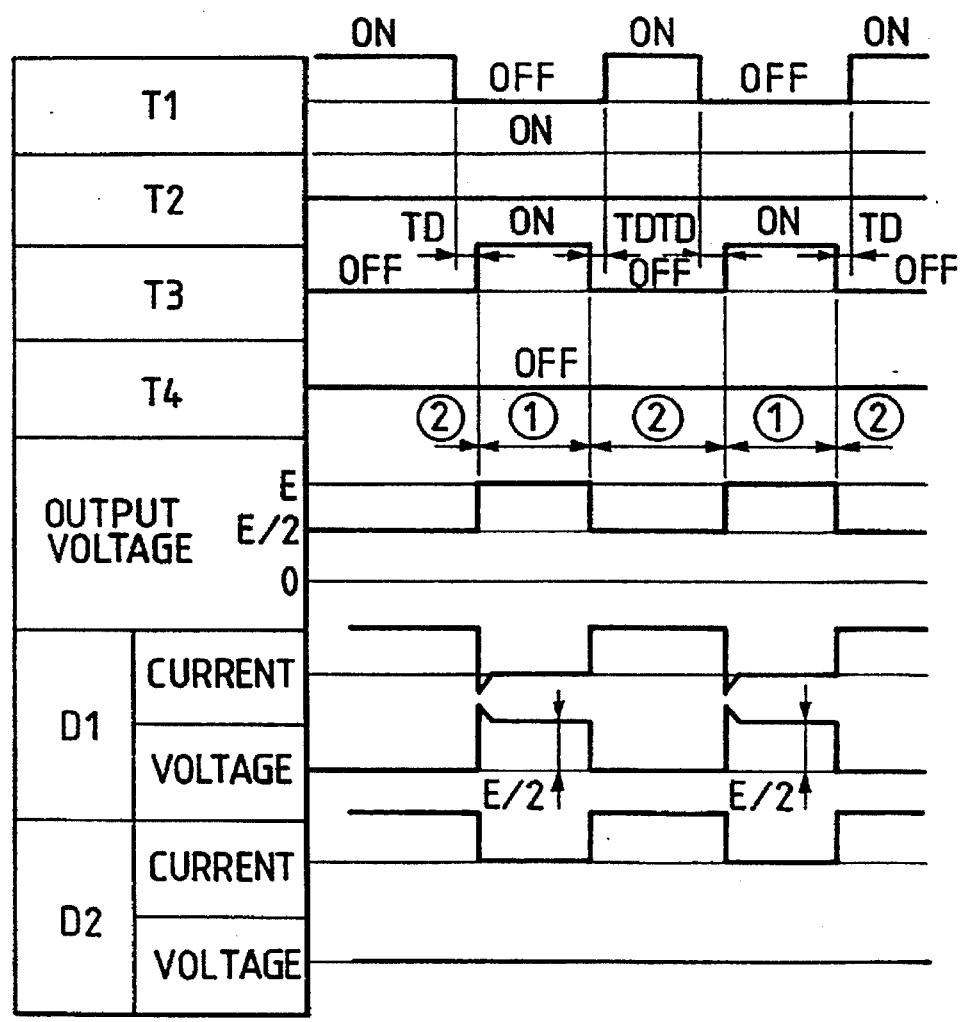
Figure 4:
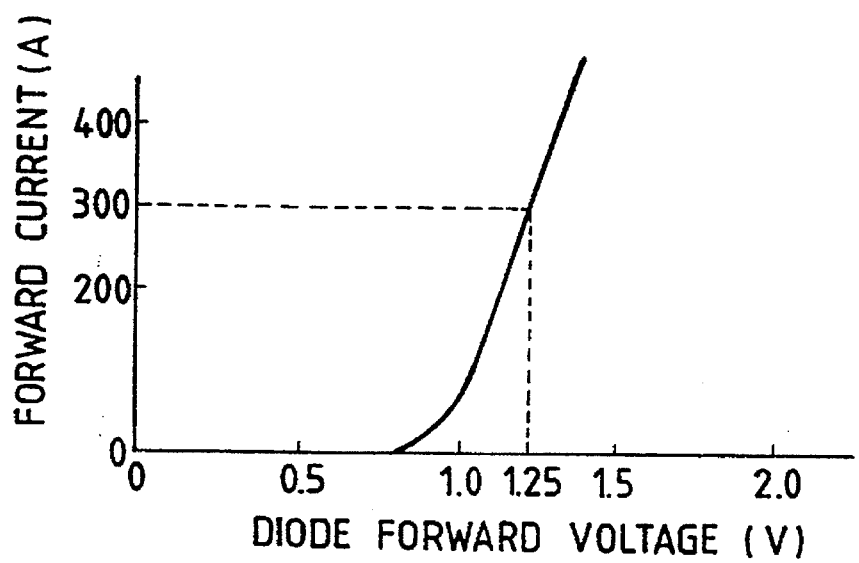
FIG. 4 is a diagram indicative of still another aspect of the principles of the invention.
Figure 4A:
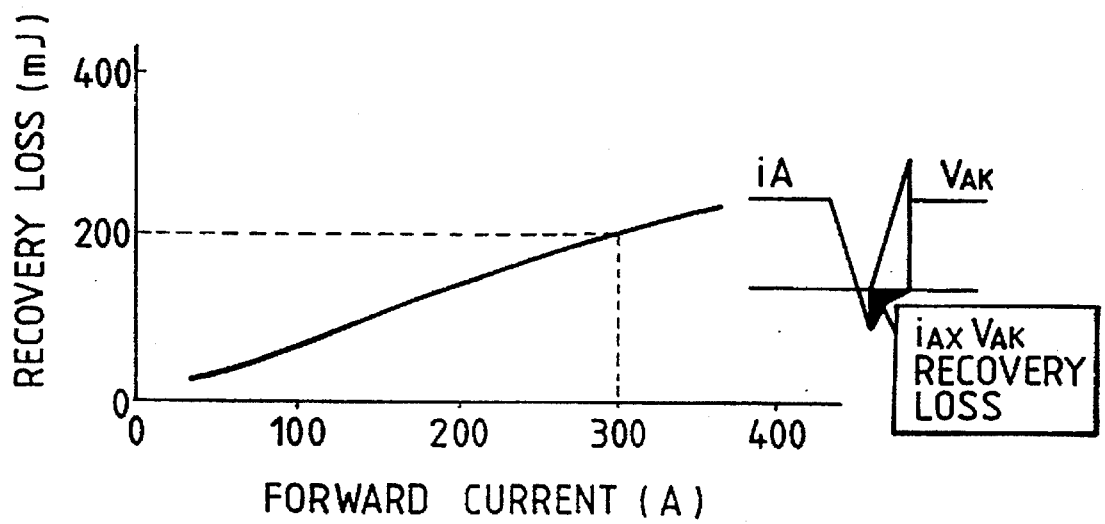

FIGS. 2 and 4 are diagrams indicative of a mode of operation for one phase component in the neutral point clamped converter. FIG. 2 shows a mode of voltage change (ac side voltage) between transistors $T_2$ and $T_3$ changing between 0 and E/2, while FIG. 3 shows a mode of change of the ac side voltage changing between E/2 and E.

The neutral point clamped converter going through these operational modes provided therein is adapted to convert ac to dc, or invert dc to ac.

Firstly in FIG. 2, by switch-on of transistor $T_2$, a neutral point voltage is output through clamping diode $D_{12}$ and transistor $T_2$ to a load 10, thus, causing a current to flow in the direction of (1). Then, by switch-off of transistor $T_2$, the current having been flowing to the load 10 is switched to flow through free wheel diodes $D_3$, $D_4$. By repetition of this switch-on and off cycle, a voltage of E/2 and 0 is output to the load. During this period, on-off signals for $T_1$ to $T_4$ are as follows: $T_1$ is constantly off, and $T_1$ is constantly on, while $T_2$ and $T_4$ repeat oppositely phased off→on and on→off cycles, separated by a non-lap time $T_D$, which prevents short circuiting of the voltage supply ($T_3$ being constantly on).

When switching the free wheel diodes $D_3$, $D_4$ from mode (2) in free wheel to the mode (1), $T_2$ is switched from off-state to on-state, which switching operation causes E/2 to be applied to the free wheel diode $D_4$ ($T_3$ being constantly on). At this moment, a current flowing through the free wheel diode $D_4$ from its anode to its cathode is cancelled by E/2 from the power supply depicted in the lower portion in the drawing. This current gradually decreases, and flows in the reverse direction for a short duration. This event is called a recovery phenomenon of the diode, which causes a recovery loss to occur in the diode.

At this moment, a load current similar to that flowing through $D_4$ flows through the free wheel diode $D_3$, however, since an on-signal is constantly applied to transistor $T_3$ in this mode of operation, the transistor $T_3$ assumes an on-state whenever a reverse current tends to flow through the free wheel diode $D_3$. Thus, it can be clearly understood that such recovery phenomena that occurred in the free wheel diode $D_4$ will not occur in $D_3$.

With reference to FIG. 3, it will be described that the same is true with respect to free wheel diodes $D_1$ and $D_2$. By switching transistor $T_3$ on, a current flows through load 10, transistor $T_3$ and diode $D_{13}$ to the neutral point of voltage in the direction of (1) as shown in the drawing. Then, by switching the transistor $T_3$ off, the current flowing through the load 10 is caused to flow through free wheel diodes $D_1$ and $D_2$. Through repetition of such switching, the load 10 is supplied with a voltage 5 of E/2 and E.

During such operation, on and off signals of transistors $T_1$ to $T_4$ are as follows: $T_4$ is constantly off, $T_2$ is constantly on, and $T_1$ and $T_3$ repeat "off to on" and "on to off", separately by a non-lap time $T_D$ which prevents short circuiting of the voltage supply.

When switching the free wheel diodes $D_1$, $D_2$ from mode (2) in a free wheel loop to mode (1), the transistor $T_3$ is switched from the off-state to an on-state, thereby, E/2 is applied to the free wheel diode $D_1$. During this operation, a current flowing through the free wheel diode $D_1$ from its anode to its cathode is canceled by E/2 from the power supply depicted in the upper portion in the drawing. The current gradually decreases and eventually flows in the reverse direction for a short duration. In this instance, a recovery loss occurs in the free wheel diode $D_1$. At this time, a load current similar to that flowing through $D_3$ described above flows through the free wheel diode $D_2$, however, since an on-signal is constantly applied to transistor $T_2$ in this mode of operation, $T_2$ assumes an on-state whenever a reverse current tends to flow through the free wheel diode $D_2$, thereby preventing an occurrence of recovery phenomena therein that occurred in the free wheel diode $D_1$.

It should be clearly understood from the foregoing description that although there occur recovery phenomena in the outer free wheel diodes $D_1$ and $D_4$, no recovery phenomena take place in the inner free wheel diodes $D_2$ and $D_3$.

FIG. 4 shows a forward voltage-current characteristic and a recovery loss diagram for comparing losses between the outer free wheel diodes $D_1$, $D_4$ and the inner free wheel diodes $D_2$, $D_3$. Assuming that a switching frequency of inner transistors $T_2$, $T_3$ is 3 KHz, a conduction width of the free wheel mode is 50% duty, and an average value of an ac diode current is 300 A, a loss thereof can be broken down as follows.

Forward loss=300A×1.25V×0.5(duty)×0.5(ac half wave)=94W

Recovery loss=0.25J×3000(switching frequency)×0.5(ac half wave)=375W

It can be seen from the above equations that the loss in the outer free wheel diodes $D_1$, $D_4$ (which experience a recovery loss) amounts to 469 W, while the loss in the inner free wheel diodes $D_2$, $D_3$ (which do not experience any recovery loss) is only 94 W, thus indicating the presence of a large imbalance.

In order to correct such imbalance in the losses caused in the free wheel diodes between the outer and the inner sides, the following countermeasures have been contemplated according to the invention.

(1) The outer free wheel diodes are adapted to have a larger current capacity than that, of the inner free wheel diodes, (2) the number of parallel connected outer free wheel diodes exceeds the number of parallel connected inner free wheel diodes, and (3) each outer free wheel diode is provided with a cooling fin whose cooling performance is greater than a cooling performance for each inner free wheel diode.

One embodiment of the invention of FIG. 1 implements the concept of the above (2) according to the idea of the above (1).

Advantageously, according to this embodiment of the invention, in which the current capacity of the outer free wheel diodes is adapted to become larger than the capacity of the inner free wheel diodes, the unbalance resulting between the inner and the outer diodes can be minimized by such arrangement.

Figure 5:
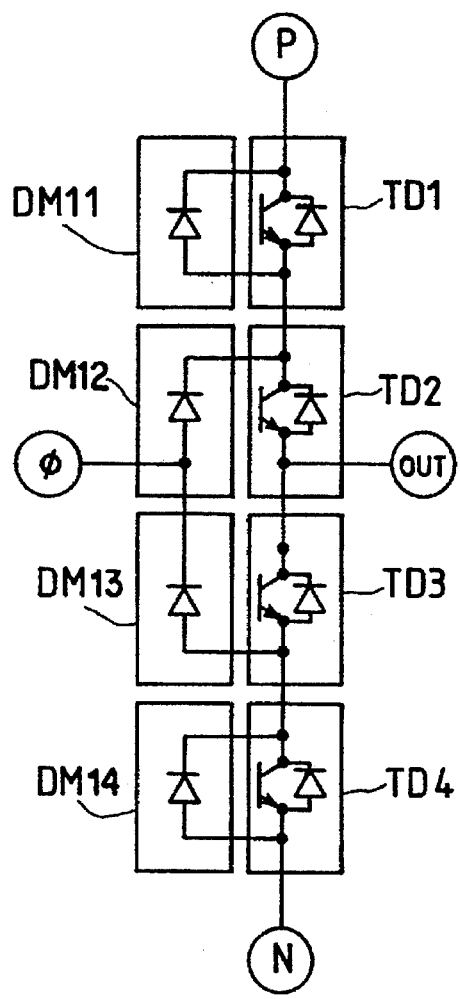
FIG. 5 is a schematic diagram illustrative of arrangement of the switching elements in modules.

With reference to FIG. 5 there is shown a schematic diagram of a main circuit of a converter of FIG. 1, indicative of only one-phase component of one example according to the invention, using a semiconductor switching module in which respective pairs of transistors $T_1$ to $T_4$ and free wheel diodes $D_1$ to $D_4$ are assembled into respective single modules.

Minimum requisite components which constitute a neutral point clamped converter circuit include semiconductor switching modules $TD_1$ to $TD_4$, and diode modules $DM_{12}$, $DM_{13}$. In addition to these, diode modules $DM_1$, $DM_{14}$ are further connected to semiconductor switching modules $TD_1$, $TD_4$ in parallel therewith respectively so as to increase capacities thereof.

In the configuration of FIG. 5, four semiconductor modules $TD_1$–$TD_4$ are aligned linearly in series connection, and diode modules $DM_{12}$, $DM_{13}$ are juxtaposed to the semiconductor modules $TD_2$, $TD_3$ respectively, so as to reduce wiring and facilitate a compact circuit configuration. Then, diode modules $DM_{11}$, $DM_{14}$ are disposed respectively toward the outer ends of the diode modules $DM_{12}$, $DM_{13}$ thereby to provide a converter circuit having an excellent spatial efficiency. That is, since the cooling components can be mounted on the back surface of the module, a decrease in space and area due to their mounting can be achieved.

Figure 6:
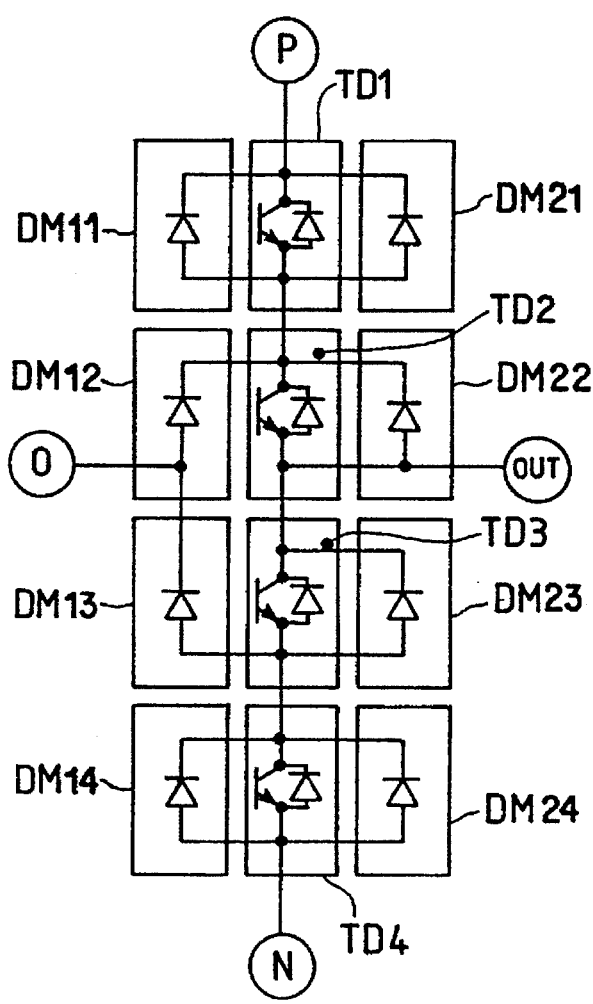
FIG. 6 is a schematic diagram which shows another embodiment of the invention.

FIG. 6 shows an actual circuit arrangement of another embodiment of the invention which increases the current capacities both of outer free wheel diodes and inner free wheel diodes, and still minimizes the imbalance of losses therebetween.

The circuit of FIG. 6 is based on the circuit of FIG. 5, and it further comprises additional free wheel diodes $DM_{21}$–$DM_{24}$ connected in reverse parallel therewith.

More particularly, respective diode modules are connected in reverse parallel to semiconductor switch modules $TD_1$ to $TD_4$, and additional diode modules $DM_{21}$, $DM_{24}$ are added only to the outer free wheel diodes by connecting in reverse parallel to transistors $TD_1$, $TD_4$.

This circuit configuration of the invention provides the advantage that the imbalance in the losses can be minimized and also any deficiency in capacity of the outer free wheel diodes can be eliminated as well.

Further, although in the embodiments of FIGS. 5 and 6 the number of parallel connected free wheel diodes is designated as one or two, the invention is not limited thereto, and the number of such diodes can be further increased to attain the object of the invention likewise.

Figure 7:
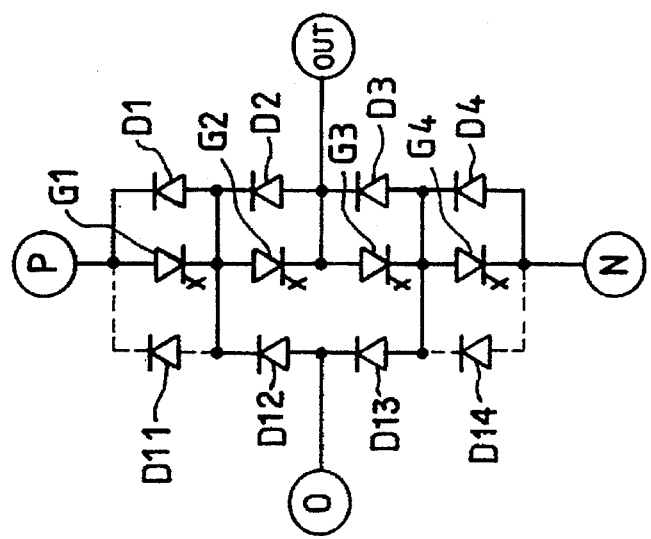
FIG. 7 is a diagram of a circuit according to the invention utilizing pressure bonding semiconductor elements.

FIG. 7 shows an embodiment of the invention which uses a planar type semiconductor element such as a GTO thyristor fabricated by pressure bonding a semiconductor pellet disposed between copper posts in a disk form at their both ends. More specifically, it is shown in this example that free wheel diodes $D_{11}$, $D_{14}$ are connected in reverse parallel to GTO thyristors $G_1$, $G_4$ respectively. Of course, the object of minimizing the imbalance of the losses can be accomplished simply by providing the diodes $D_1$, $D_4$ with a greater current capacity than $D_2$, $D_3$, without addition of free wheel diodes $D_{11}$, $D_{14}$, as described previously.

Figure 8:
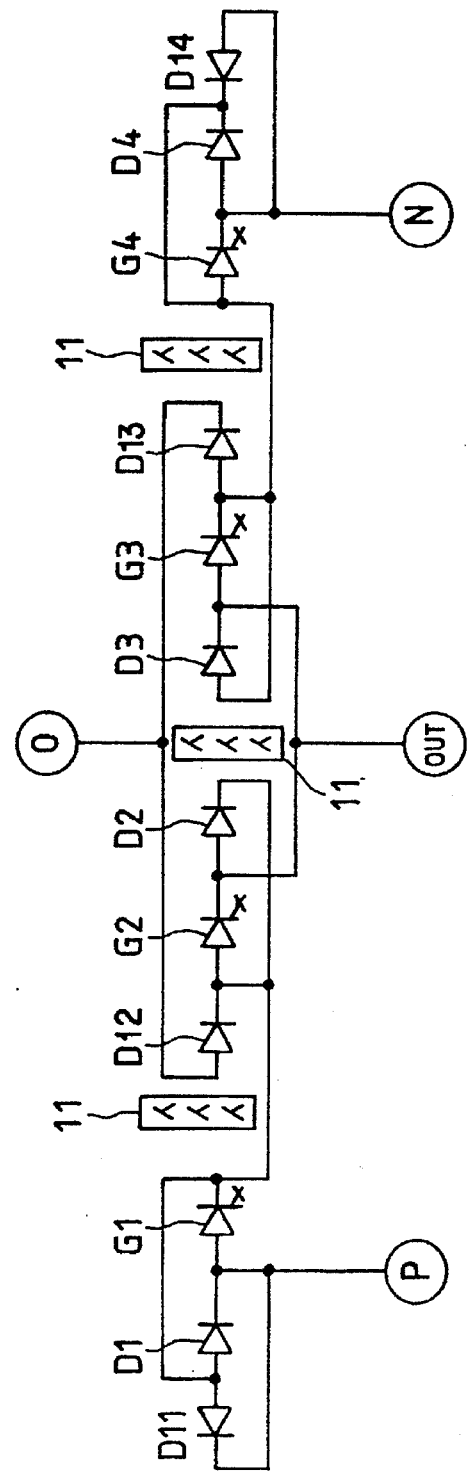
FIG. 8 is a schematic diagram which shows an arrangement of the pressure bonding semiconductor elements.

FIG. 8 shows an arrangement of switching elements and diodes subject to pressure bonding to compose a converter circuit utilizing the planar semiconductor elements as shown in FIG. 7 according to the invention.

When using planar semiconductor elements such as GTO thyristors, all components corresponding to one phase must be aligned on a common axis in respect of the specific design requirements to deal with the pressure bonding and the particular cooling method. As shown in the drawing of FIG. 8, this straight alignment of circuitry of one phase components can readily be implemented by inserting insulation members 11 between GTO thyristor $G_1$ and a clamping diode $D_{12}$, between free wheel diodes $D_2$ and $D_3$, and between the clamping diodes, the GTO thyristor $G_4$ respectively. Also, diodes $D_{11}$ and $D_{14}$ are disposed outward from the free wheel diodes $D_1$ and $D_4$, respectively. This arrangement is then subjected to a pressure bonding in perpendicular directions under a prescribed pressure.

Figure 9:
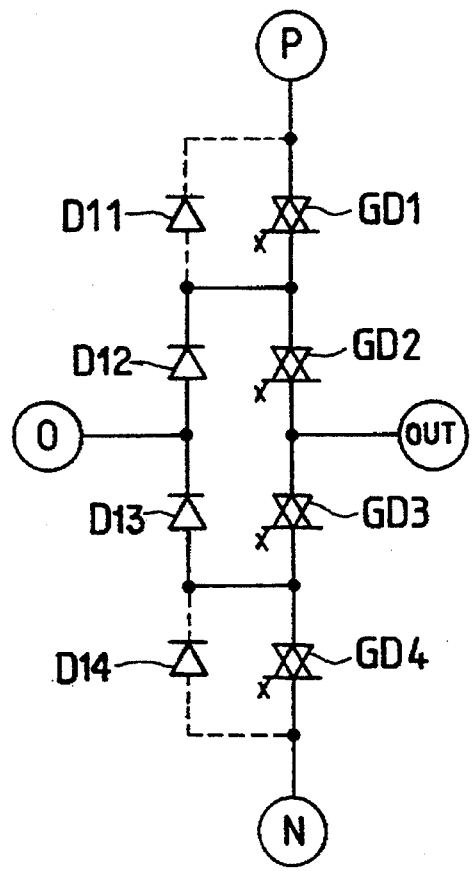
FIG. 9 is a diagram of a circuit according to the invention utilizing reverse conducting pressure bonding semiconductor elements.

In FIG. 9, there is shown a planar semiconductor device such as a reverse conducting GTO thyristor in another embodiment of the invention, which has integrated switching elements and reverse parallel connection diodes on the same semiconductor pellet. In this embodiment, free wheel diodes $D_{11}$ and $D_{14}$ are connected in reverse parallel with reverse conducting GTO thyristors $GD_1$ and $GD_4$, respectively. As noted previously, of course, the object of the invention can also be attained by providing a greater current capacity to $GD_1$ and $GD_4$ than that of $GD_2$ and $GD_3$ without addition of $D_{11}$, $D_{14}$.

Figure 10:
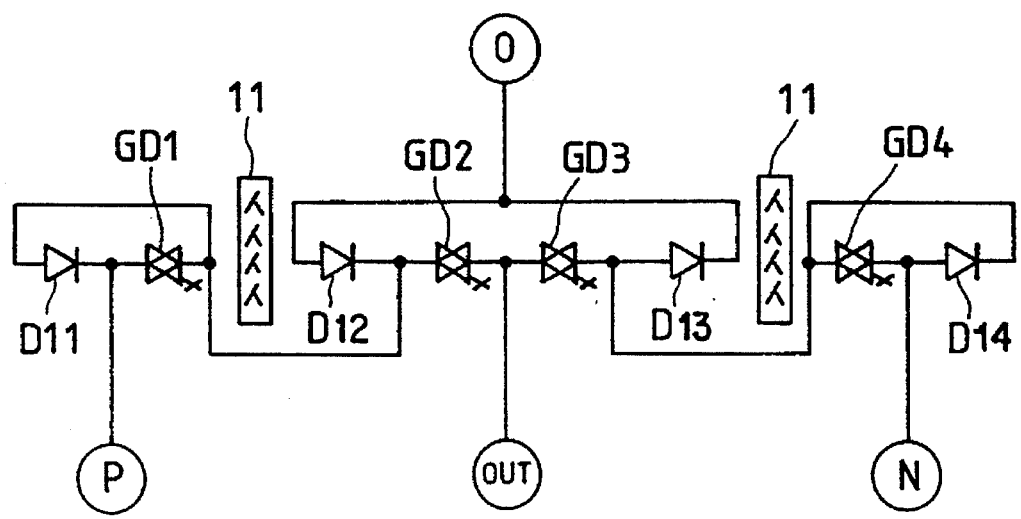
FIG. 10 is a diagram which shows an arrangement of the reverse conducting pressure bonding semiconductor elements.

FIG. 10 shows an arrangement of switching elements and diodes suitable for pressure-bonding, to constitute a converter circuit utilizing the planar semiconductor device of FIG. 9. It can be seen that this embodiment can be readily implemented by pressure-bonding these elements in the above arrangement from both sides, with a predetermined pressure.

When using the planar semiconductor elements, the object of the invention can be attained as well by varying the heat dissipating capacity of individual cooling fins for cooling individual elements.

Figure 11:
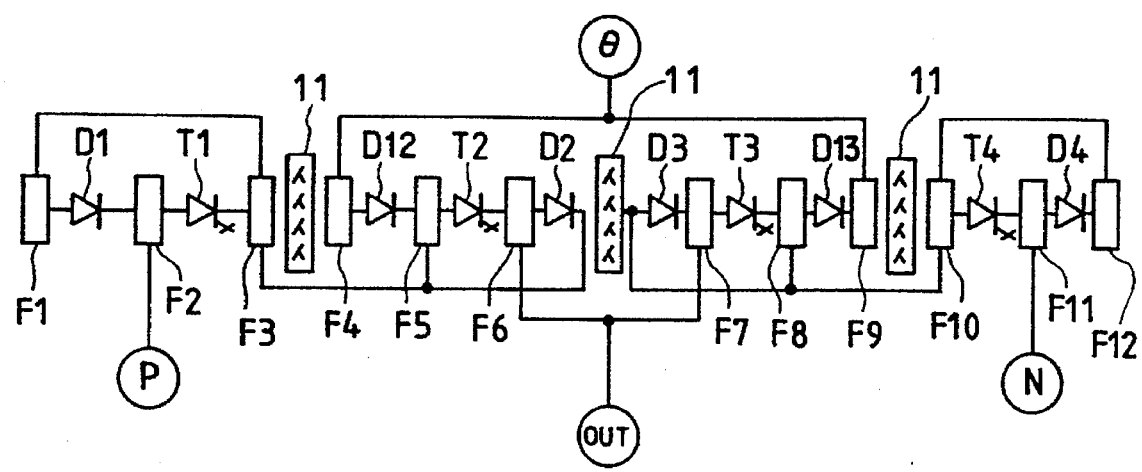
FIG. 11 is a schematic diagram which shows another embodiment of the invention.

In FIG. 11, there is shown another embodiment of the invention which is a modification of the embodiment of FIG. 7. In FIG. 11, the free wheel diodes $D_{11}$, $D_{14}$ are omitted, and instead, capacities of cooling fins for cooling these free wheel diodes are varied between the outer free wheel diodes $D_1$, $D_4$ and the inner free wheel diodes $D_2$, $D_3$. In order to enhance cooling capacities for the outer diodes, free wheel diode $D_1$ is provided with two cooling fins $F_1$, $F_2$ on both sides thereof; similarly, free wheel diode $D_4$ is provided with two cooling fins $F_{11}$, $F_{12}$ on both sides thereof. On the other hand, free wheel diode $D_2$ is provided with a single fin $F_6$ on one side thereof and free wheel diode $D_3$ is provided with a single fin $F_7$ on one side thereof.

Even if all of respective diodes are provided with cooling fins on both sides thereof, by providing the cooling fins for the outer free wheel diodes $D_1$, $D_4$ with a greater cooling capacity than for the inner free wheel diodes $D_2$, $D_3$, the object of the invention can also be attained.

Figure 12:
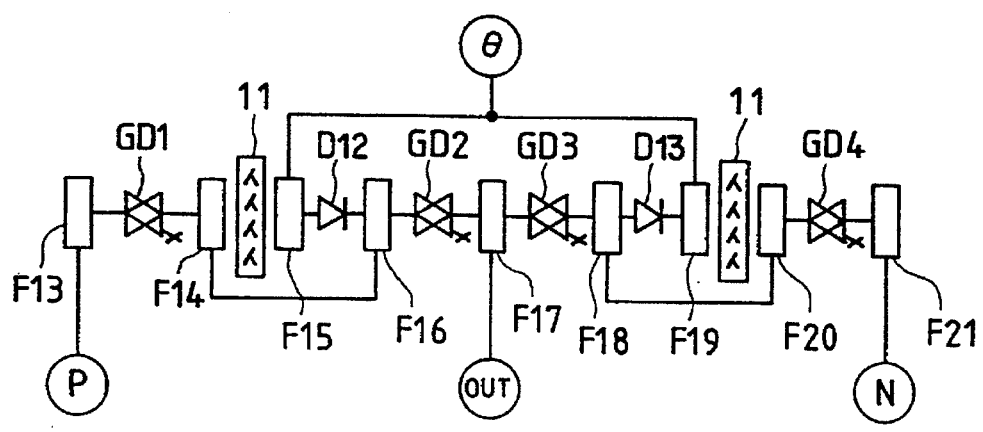
FIG. 12 is a schematic diagram which shows still another embodiment of the invention.

FIG. 12 shows still another embodiment of the invention, based on a modification of the embodiment of FIG. 9, in which the object of the invention has been accomplished with a minimum number of cooling fins. In the embodiment of FIG. 12, instead of adding free wheel diodes $D_{11}$, $D_{14}$, the outermost reverse conducting GTO thyristors $GD_1$, $GD_4$ are provided with four cooling fins $F_{13}$, $F_{14}$, $F_{20}$ and $F_{21}$, while reverse conducting GTO thyristors $GD_2$, $GD_3$ disposed internally are provided with three cooling fins $F_{16}$, $F_{17}$ and $F_{18}$.

As described above, the object of the invention can be accomplished likewise by providing cooling fins for cooling the outer reverse conducting GTO thyristors $GD_1$, $GD_4$ with a greater cooling capacity than that of the inner reverse conducting GTO thyristors $GD_2$, $GD_3$.

According to the foregoing embodiment of the invention, the loss imbalance associated with the prior art can be minimized without increasing the number or capacity of free wheel diodes.

By way of example, all of the foregoing embodiments described herein are concerned with converters because the problematic imbalance of power dissipation becomes most significant during power running of an electric train when its converters are converting ac to dco However, even in the case of a three-level ac inverter such as a neutral point clamped inverter. in which dc is inverted into three-level ac to drive an induction motor, a substantial imbalance of losses occurs between inner and outer free wheel diodes due to regenerative operation. Thus, the outer free wheel diodes in the three-phase inverter may be adapted to have a greater capacity as described above to prevent such occurrence. This invention, that is, can be applied to any electric power converter of a neutral point clamped type.

Further, in a main circuit configuration of a neutral point clamped converter circuit in conjunction with a neutral point clamped inverter, although it is necessary to provide a greater current capacity for the outer free wheel diodes or a greater cooling capacity therefor on its converter circuit, it is not always necessary to provide the same on the inverter.

Further, the foregoing embodiments of the invention described above are all concerned with electric train controls. However, the invention is not limited to train controls, and can be applied to any application requiring a neutral point clamped converter or inverter. This includes, for example, a converter or inverter main circuit for use in rolling mill controls or the like.

As described heretofore, according to the invention, a neutral point clamped electric power conversion apparatus has been manufactured at a reduced cost, which features the advantage that the imbalance in losses between the outer free wheel diodes and the inner free wheel diodes has been solved by employing an appropriate diode having an adequate capacity trimming superfluity design to each of the foregoing diodes, and by providing an adequate cooling capacity to each of them.

What is claimed is:

1. An electrical power conversion apparatus comprising:
    a first series circuit including first, second, third and fourth switching elements connected in series;
    a second series circuit of clamping diodes connected in reverse parallel with said first series circuit, one end thereof being connected to a first connection node disposed between said first and second switching elements and another end thereof being connected to a second connection node disposed between said third and fourth switching elements, and a plurality of free wheel diodes, one of said free wheel diodes being connected in reverse parallel with each of said switching elements; wherein
    free wheel diodes connected in reverse parallel to said first switching element and said fourth switching element respectively each have a current capacity which is greater than a current capacity of free wheel diodes connected in reverse parallel to said second switching element and said third switching element, whereby an imbalance in power loss between said diodes connected in parallel with said first and fourth switching elements and said diodes connected in parallel with said second and third switching elements, is substantially diminished.

2. An electric power apparatus according to claim 1, wherein:
    said first and fourth switching elements each have a greater number of free wheel diodes connected in reverse parallel therewith, so as to provide an increased current capacity, compared with the number and current capacity of the free wheel diodes connected in reverse parallel with said second and third switching elements.

3. An electric power apparatus according to claim 1, wherein;
    each of said first and fourth switching elements comprises cooling means for cooling free wheel diodes connected in reverse parallel therewith, said cooling means having a greater cooling capacity, thereby increasing the cooling capacity of the diodes connected therewith, compared to cooling means for cooling free wheel diodes connected in reverse parallel with said second and third switching elements.

4. An electric power conversion apparatus according to claim 1, wherein:
    said electric power conversion apparatus is a neutral point clamped converter for converting an alternating current into a direct current.

5. An electric power conversion apparatus according to claim 1, wherein:
    said electric power conversion apparatus is a neutral point clamped inverter for inverting a direct current into an alternating current.

* * * * *